L. M. KOEHLER.
Ditching-Plow.
No. 208,103. Patented Sept. 17, 1878.
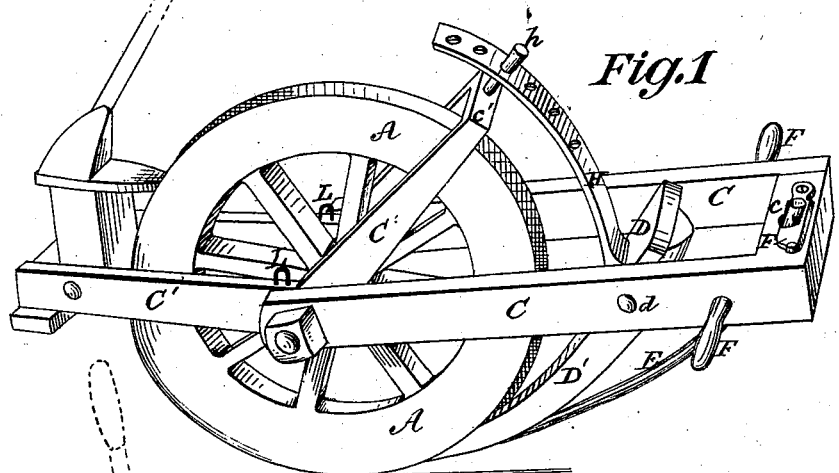
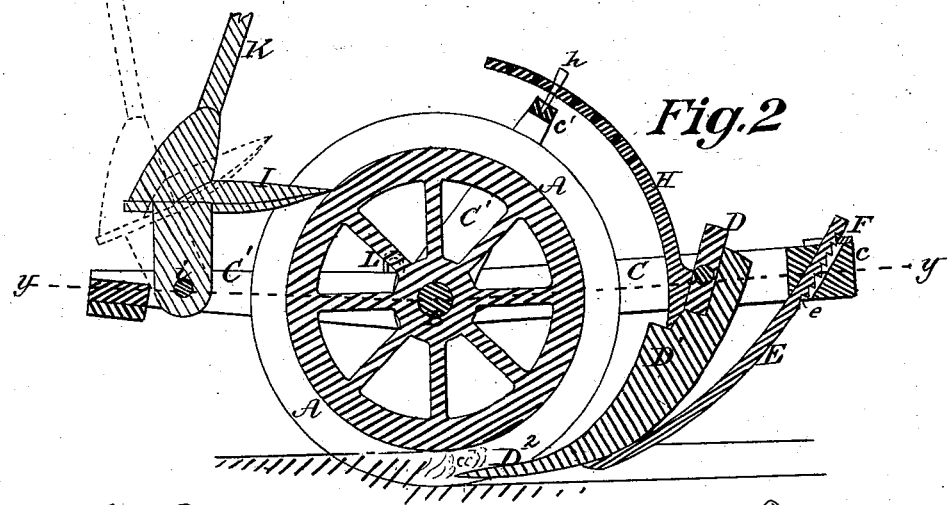
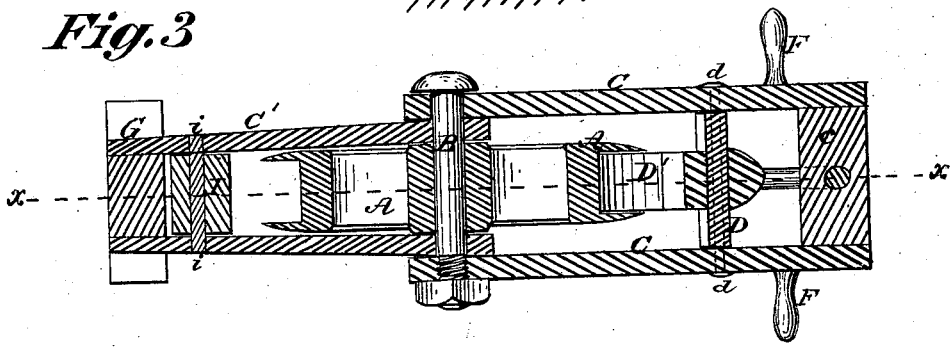
Witnesses:
Seward Beall
Wm H Rowe
Inventor:
Louis M. Koehler,
by his Atty.
C. F. Rowe

UNITED STATES PATENT OFFICE.

LOUIS M. KOEHLER, OF BURLINGTON, IOWA.

IMPROVEMENT IN DITCHING-PLOWS.

Specification forming part of Letters Patent No. 208,103, dated September 17, 1878; application filed January 19, 1878.

*To all whom it may concern:*

Be it known that I, LOUIS M. KOEHLER, of Burlington, in the county of Des Moines and State of Iowa, have invented certain new and useful Improvements in Ditching-Plows, of which the following is a specification:

My invention relates to that class of ditching-machines in which a revolving cutter-wheel having a grooved periphery is employed to make side indentations, and a plow, following between the cutter-edges of the wheel and immediately in the rear of the wheel, removes the earth, thus completely forming the ditch.

The object of my invention is to so construct and arrange the parts of the device that it may be used as an ordinary plow and easily operated and adjusted by a single attendant.

In the accompanying drawings, Figure 1 is a perspective view of my improved ditching-plow; Fig. 2, a vertical central longitudinal section of the same in the line $x\ x$ of Fig. 3, and Fig. 3 is a horizontal section of the same in the line $y\ y$ of Fig. 2.

The cutter-wheel A is preferably made of iron, to give it weight and stability, and is grooved in its periphery to form cutting-disks, that make the side indentations of the ditch. The wheel revolves freely upon its axle B, which passes through the frame-pieces and securely connects the frame to the wheel. The rear section, C, of the frame is connected to the ends of the axle so that it will turn thereon, and is pivoted at $d\ d$ to the plow-beam bolster D, arranged between the side pieces of the rear frame. The plow-beam $D^1$ is rigidly connected to the bolster D, and projects downwardly, directly in line with and in the rear of the cutter-wheel A, so that the plowshare $D^2$ will enter the groove of the wheel.

The beam $D^1$ may be braced and supported by a rod, E, connecting the lower end of the beam to the cross-piece $c$ of the frame C. The rod E may be curved and pass through a curved slot or hole in the cross-piece $c$, which will afford it lateral support.

Notches $e$ may be formed in the end of the rod, and a clip, F, hinged to the cross-piece of the frame, may be arranged to take into any one of the notches, which will allow the plow to be adjusted, and also receive a portion of its thrust.

Handles F F are secured to the rear frame to facilitate raising and lowering the plow and cutter-wheel, to avoid obstructions and for regulating the depth of the ditch. The front portion or draft-frame, C', is formed of angular side pieces, connected at their rear ends by a cross-piece, $c'$, and at their front ends by the draft-bar G. The draft-frame straddles the wheel, and is connected at the angle of its side pieces with the axle B, so that it may turn thereon. The front portion of the draft-frame extends in a horizontal direction at a suitable height for the horses in plowing, and the rear portion projects upward and rearward, in order to be adjustably connected with the rear frame and plow-beam in the following manner: A segment-plate, H, is securely connected at the lower end to the plow bolster and beam, and encircles the upper rear portion of the cutter-wheel, and is connected by a pin, $h$, passing through the holes in the segment-plate and cross-piece $c'$ of the draft-frame.

Any number of holes required may be formed in the segment-plate, by means of which the frames may be adjusted at any desired angle one with the other, as well as with the angle of the plow-beam.

A scraper-shoe, I, is secured to a block, pivoted at $i\ i$ to the front end of the draft-frame, and is provided with a hand-lever, K, that may be weighted to hold the shoe close down into the groove in the periphery of the cutter-wheel, and which, by means of the lever K, will permit the scraper to be moved into or out of the groove, to clear it of material that becomes wedged into it.

Staples L L may be secured to the frame near the axle of the wheel, by which to connect a chain or tackle for raising the wheel and plow from the ditch when it becomes fast, or when it is desired to reverse or change the position of the machine. The earth in most cases will pack itself into the groove sufficiently to be raised by the revolution of the wheel until it is intercepted by the scraper and thrown out to the sides of the ditch. Any loose clods or particles will be run up the beam and segment-plate and properly discharged to the sides of the ditch.

By the above-described construction I am enabled to secure a machine that can be easily handled by a single attendant, and to dispense with supporting wheels and rollers, which are cumbersome, and render the device incapable of following narrow ledges or turning short curves, as required in irrigating-ditches.

By using the cutter-wheel and plow as the sole support of the machine, the depth of the ditch may be regulated by the handles of the frame, the draft of the team being employed by the attendant to raise the plow or to depress it into the earth.

The frame, being made in two sections secured separately to the axle of the cutter-wheel, and connected together at the rear of the cutter-wheel by the arch or segment-plate following the circumference of the wheel, and provided with perforations and linchpin or other adjustable connecting device, affords a simple, strong, and effectual construction that will admit the draft of the plow or the height of the handles to be readily adjusted. The segment-plate, arranged opposite the groove of the wheel and following its circumference, will serve to direct any loose clods from falling from the groove before they are delivered to the discharging-shoe.

I claim as my invention and desire to secure by Letters Patent—

1. The combination and arrangement of the revolving cutter-wheel, the angular draft-frame and the rear frame, both secured independently to the axle of the revolving cutter-wheel, and the segment-plate for adjustably connecting the frames, substantially as and for the purpose described.

2. The combination of the frame, the revolving grooved cutter-wheel, the scraper, hinged to the frame and entering the groove of the cutter-wheel, and the hand-lever, secured to and operating the scraper, substantially as and for the purpose described.

LOUIS M. KOEHLER.

Witnesses:
PETTER I. KOEHLER,
J. H. BREMMERMANN.